(12) United States Patent
Kaneko (10) Patent No.: US 10,414,262 B2
(45) Date of Patent: Sep. 17, 2019

(54) POWER UNIT MOUNT STRUCTURE

(71) Applicant: Toyota Jidosha Kabushiki Kaisha, Toyota-shi, Aichi-ken (JP)

(72) Inventor: Hayato Kaneko, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/870,402

(22) Filed: Jan. 12, 2018

(65) Prior Publication Data

US 2018/0222304 A1    Aug. 9, 2018

(30) Foreign Application Priority Data

Feb. 6, 2017  (JP) .................................. 2017-019557

(51) Int. Cl.
| | | |
|---|---|---|
| *B60K 5/12* | (2006.01) | |
| *F16F 7/104* | (2006.01) | |
| *F16F 1/38* | (2006.01) | |
| *B60K 5/04* | (2006.01) | |

(52) U.S. Cl.
CPC .......... *B60K 5/1208* (2013.01); *B60K 5/1216* (2013.01); *B60K 5/1283* (2013.01); *B60K 5/04* (2013.01); *B60K 5/1241* (2013.01); *B60Y 2306/01* (2013.01); *F16F 1/3849* (2013.01); *F16F 7/104* (2013.01)

(58) Field of Classification Search
CPC ...... B60K 5/1208; B60K 5/04; B60K 5/1216; B60K 5/125; F16F 7/104
See application file for complete search history.

(56) References Cited

U.S. PATENT DOCUMENTS

| | | | | |
|---|---|---|---|---|
| 5,636,826 A | * | 6/1997 | Nakagaki | .................. F16F 7/00 248/224.51 |
| 5,740,876 A | * | 4/1998 | Shimose | ............... B60K 5/1216 180/232 |
| 5,769,174 A | * | 6/1998 | Lee | .......................... B25F 5/006 173/162.1 |
| 9,630,484 B1 | * | 4/2017 | Valdez | ..................... B60K 5/12 |
| 2004/0154855 A1 | | 8/2004 | Hirayu | |
| 2006/0022390 A1 | * | 2/2006 | Arakawa | ............... B60K 5/1216 267/140.11 |
| 2007/0199742 A1 | * | 8/2007 | Miyahara | .................. B60K 5/04 180/58 |
| 2008/0150203 A1 | * | 6/2008 | Mir | ....................... B60K 5/1208 267/140.11 |
| 2012/0180200 A1 | * | 7/2012 | Gaudet | .................. A42B 3/121 2/411 |
| 2012/0267184 A1 | * | 10/2012 | Joly | ........................ F16F 1/373 180/291 |

(Continued)

FOREIGN PATENT DOCUMENTS

JP    2004175316 A    6/2004

*Primary Examiner* — Frank B Vanaman
(74) *Attorney, Agent, or Firm* — Dinsmore & Shohl LLP (57) ABSTRACT

A mount member is located between a front cross member and a power unit of a suspension member. The mount member includes a damper fixed to the front cross member of the suspension member and a bracket fixed to an upper end of the damper. The bracket couples the damper to the power unit. An extension wall extends downward from the bracket. The extension wall at least partially overlaps the damper in a side view.

18 Claims, 3 Drawing Sheets

(56) References Cited

U.S. PATENT DOCUMENTS

| | | | |
|---|---|---|---|
| 2013/0068552 A1* | 3/2013 | Kim | B60K 5/1216 |
| | | | 180/300 |
| 2015/0060633 A1* | 3/2015 | Han | F16F 13/10 |
| | | | 248/562 |
| 2016/0031308 A1* | 2/2016 | Zhao | B60H 1/00321 |
| | | | 180/65.21 |
| 2016/0039464 A1* | 2/2016 | Hirano | B62D 21/11 |
| | | | 180/312 |
| 2016/0185204 A1* | 6/2016 | Lemaire | F16F 13/10 |
| | | | 180/291 |

* cited by examiner

POWER UNIT MOUNT STRUCTURE

CROSS-REFERENCE TO RELATED APPLICATIONS

This application claims priority to Japanese Patent Application 2017-019557 filed on Feb. 6, 2017, the entire contents of which are hereby incorporated by reference.

TECHNICAL FIELD

The present disclosure relates to a power unit mount structure.

BACKGROUND

Japanese Laid-Open Patent Publication No. 2004-175316 discloses a power unit mount structure in which an internal combustion engine that generates power for a vehicle and serves as a power unit is arranged upward from a suspension member. A mount member is arranged between the suspension member and the internal combustion engine. The mount member supports the internal combustion engine on the suspension member.

With regard to frontal collision of vehicles, studies are being conducted on small overlap crashes and small offset crashes, in which the overlapping amount of a vehicle and a colliding object is small in a widthwise direction of the vehicle. In a small overlap crash, when crashing with a colliding object, it is useful that the entire vehicle including the passenger compartment be moved toward the side opposite to the colliding object in the vehicle widthwise direction. Thus, the load produced by the small overlap crash needs to be transmitted as load in the vehicle widthwise direction to a vehicle frame structure such as the suspension member. However, in the power unit mount structure of Japanese Laid-Open Patent Publication No. 2004-175316, the transmission of load when a small overlap crash occurs is not sufficiently taken into account.

SUMMARY

It is an object of the present disclosure to provide a power unit mount structure that efficiently transmits load produced by a small overlap crash as load in a vehicle widthwise direction to a frame structure of a vehicle.

To solve the above problem, in a first aspect of the present disclosure, a power unit mount structure applied to a vehicle is applied. The power unit mount structure includes a mount member located between a suspension member and a power unit that is arranged upward from the suspension member and generates power for the vehicle. The mount member includes a damper fixed to the suspension member and a bracket fixed to an upper end of the damper and coupling the damper to the power unit. An extension wall extends downward from the bracket. The extension wall at least partially overlaps the damper in a side view.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently described embodiments together with the accompanying drawings in which.

DETAILED DESCRIPTION OF THE EMBODIMENTS

One embodiment of a power unit mount structure according to the present disclosure will now be described with reference to FIGS. 1 to 4. A frame structure in a front portion of a vehicle will now be briefly described. In the following description, the right and left sides in a vehicle widthwise direction correspond to the right and left sides as viewed from the inside of the vehicle when facing toward the front side.

Figure 1:
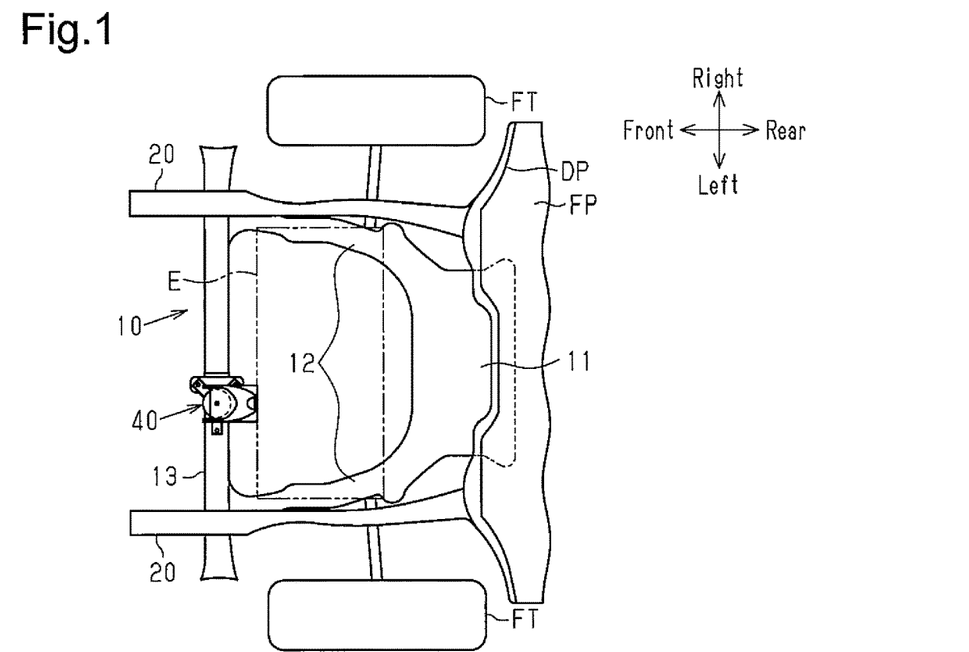
FIG. 1 is a plan view showing a frame structure and a power unit mount structure in a front portion of a vehicle.

As shown in FIG. 1, a dashboard DP projects upward (toward upper side from plane of FIG. 1) from a front edge of a floor panel FP, which forms the floor surface of the vehicle.

An engine compartment that accommodates an internal combustion engine E or the like, which serves as a power unit, is formed frontward from the dashboard DP. The engine compartment includes a suspension member 10 that supports the internal combustion engine E, a front suspension, and the like. In FIG. 1, the internal combustion engine E is simply shown as a box-shaped object.

The suspension member 10 is entirely located downward from the engine compartment between two front wheels FT. A rear cross member 11 is arranged at a rear side of the suspension member 10. The rear cross member 11, as viewed from above, has a generally quadrangular shape and is elongated in a widthwise direction of the vehicle (hereinafter referred to as the widthwise direction) and is located at the middle in the widthwise direction. A rear side of the rear cross member 11 is partially located rearward from the dashboard DP. The rear side of the rear cross member 11 is partially welded or bolted and fixed to a lower surface of the floor panel FP.

Two side rails 12 extend frontward from a front edge of the rear cross member 11. Each side rail 12 extends from the two widthwise sides of the rear cross member 11. A front end of each side rail 12 extends frontward from each wheel FT. Each side rail 12 entirely has the form of a square hollow beam.

A front cross member 13 extending in the widthwise direction is connected to the front end of each side rail 12. The two widthwise ends of the front cross member 13 extend outward in the widthwise direction from each side rail 12. Each front cross member 13 entirely has the form of a square hollow beam.

In the engine compartment, two front side members 20 extending in a front-to-rear direction are arranged upward from the suspension member 10. Rear ends of the front side members 20 are connected to the floor panel FP (floor side member). The front side members 20 extend frontward from the floor panel FP. Front ends of the front side members 20 extend frontward from the front cross member 13 of the suspension member 10. The two front side members 20 are spaced apart from each other in the widthwise direction. The front side members 20 are located inward from the two widthwise ends of the front cross member 13. Each front side member 20 entirely has the form of a square hollow beam. A front bumper (not shown) extending in the widthwise direction is connected to the front ends of the two front side members 20.

Figure 4:
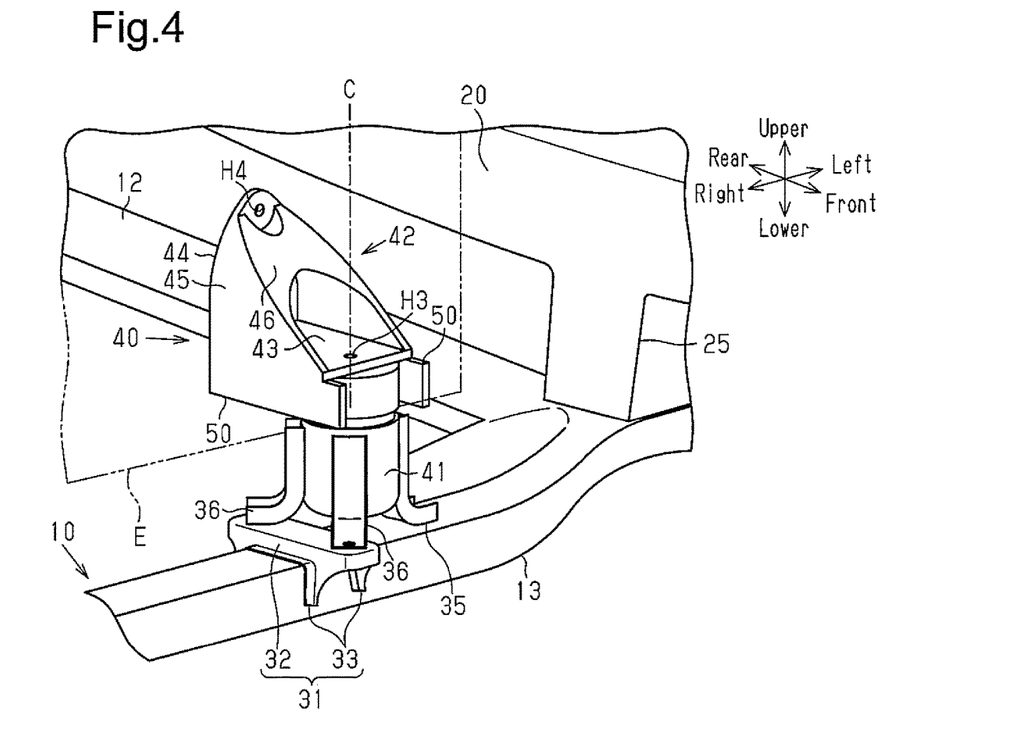
FIG. 4 is a perspective view showing the mount member.

As shown in FIG. 4, projections 25 project from lower surfaces of the front side members 20. A distal end surface (lower end surface) of each projection 25 is fixed to an upper surface of the front cross member 13. The front side members 20 are connected to the front cross member 13 by the projections 25. FIG. 4 shows the left front side member 20 and the left projection 25. In the same manner, the right projection 25 projects from the right front side member 20.

As shown in FIG. 1, the internal combustion engine E is arranged upward from the suspension member 10 between the two front side members 20. A mount member 40 is arranged on the front cross member 13. The mount member 40 is located slightly leftward from the middle of the vehicle in the widthwise direction. The mount member 40 is arranged between the front cross member 13 and the internal combustion engine E. The mounting structure of the internal combustion engine E provided by the mount member 40 will now be described in more detail.

Figure 2:
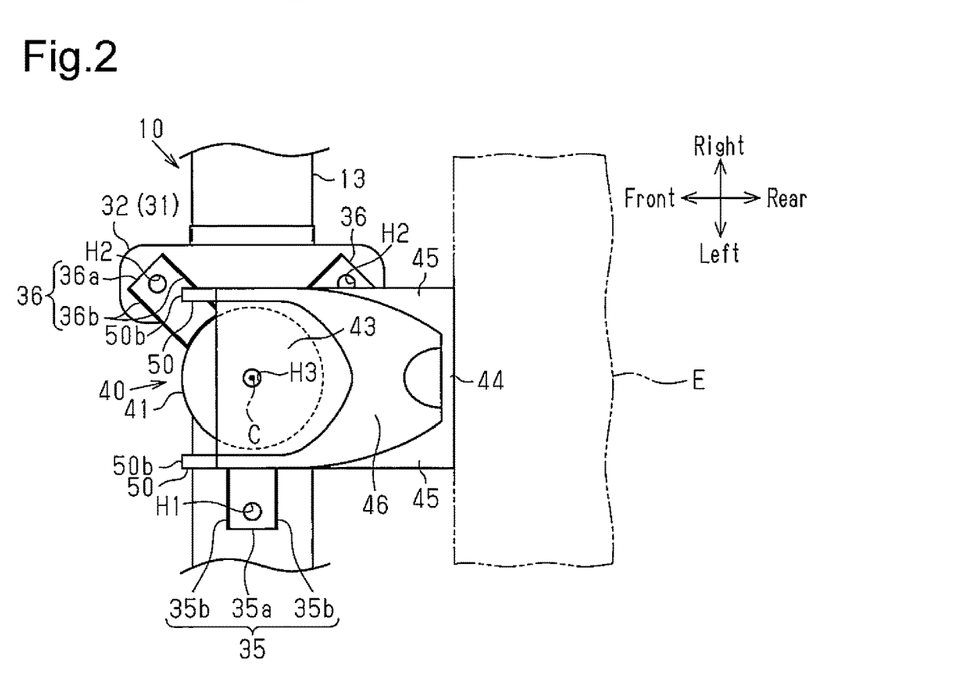
FIG. 2 is a plan view showing a mount member.

As shown in FIG. 4, a coupling body 31 is coupled to the upper side of the front cross member 13. As shown in FIG. 2, the coupling body 31 includes a seat 32, which is rectangular in the front-to-rear direction as viewed from above. The dimension of the seat 32 in the front-to-rear direction is larger than the dimension (width) of the front cross member 13 in the front-to-rear direction. Thus, two ends of the seat 32 project from the front cross member 13. As shown in FIG. 4, a peripheral portion of the seat 32 is downwardly bent at a substantially right angle. Thus, the seat 32 entirely has a predetermined thickness.

Four legs 33 extend from a lower edge of the seat 32. Two of the four legs 33 are arranged at one edge of the seat 32 in the widthwise direction. The remaining two legs 33 are arranged at the other edge of the seat 32 in the widthwise direction. The distance between the two legs 33 arranged next to each other in the front-to-rear direction is substantially equal to the dimension of the front cross member 13 in the front-to-rear direction.

The front cross member 13 is arranged between the two legs 33 of the seat 32. The lower edge of the seat 32 and the legs 33 are welded and fixed to the front cross member 13. As described above, the seat 32 has a certain thickness. Thus, an upper surface of the seat 32 is located upward from the upper surface of the front cross member 13.

As shown in FIG. 2, a first support member 35 is arranged at the left side of the coupling body 31 on the upper surface of the front cross member 13. The first support member 35 includes a strip-like central portion 35*a* that is bent to have a generally L-shaped cross section and side walls 35*b* that extend upright at a substantially right angle from edges of the central portion 35*a*. The first support member 35 is arranged with one longitudinal end of the central portion 35*a* directed leftward and the other longitudinal end of the central portion 35*a* directed upward. A bolt hole H1 extends through a left end (lower end) of the central portion 35*a*. A bolt (not shown) is inserted through the bolt hole H1 to fix the first support member 35 to the upper side of the front cross member 13.

Two second support members 36 are arranged on the upper surface of the seat 32. Each second support member 36 includes a strip-like central portion 36*a* that is bent to have a generally L-shaped cross section and side walls 36*b* that extend upright at a substantially right angle from edges of the central portion 36*a*. Each second support member 36 is arranged with one longitudinal end of the central portion 36*a* directed rightward and the other longitudinal end of the central portion 36*a* directed upward. A bolt hole H2 extends through a right end (lower end) of each central portion 36*a*. One of the two second support members 36 is fixed to a front end of the seat 32 by a bolt (not shown) inserted through the corresponding bolt hole H2. The other one of the two second support members 36 is fixed to a rear end of the seat 32 by a bolt (not shown) inserted through the corresponding bolt hole H2. The dimension of each second support member 36 in the vertical direction is smaller than the dimension of the first support member 35 in the vertical direction. The upper end of each second support member 36 is located at substantially the same vertical position as the upper end of the first support member 35.

As shown in FIG. 4, the mount member 40 is fixed between the first support member 35 and the second support members 36. The mount member 40 includes a damper 41 fixed to the front cross member 13 by the first support member 35 and the second support members 36.

Figure 3:
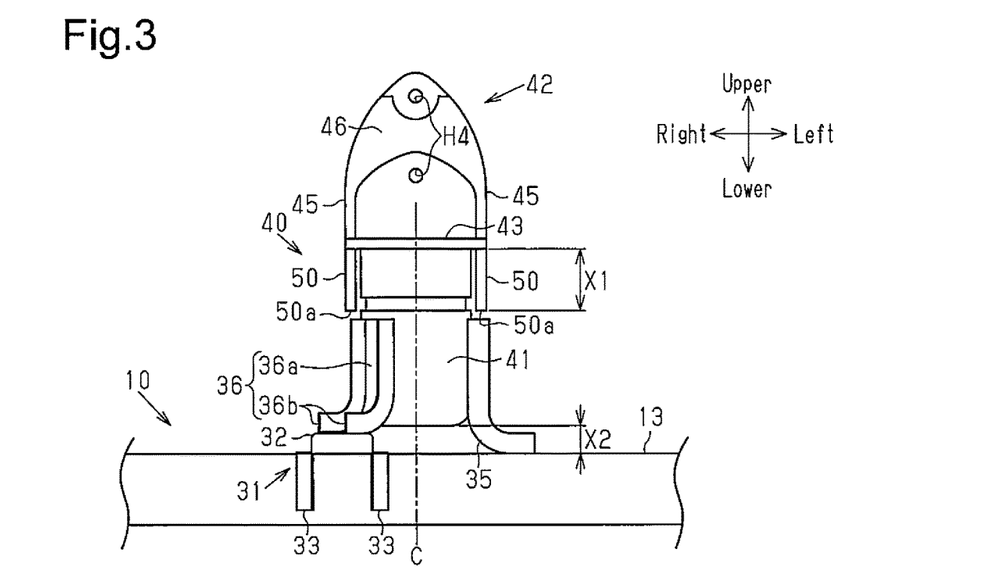
FIG. 3 is a front view showing the mount member.

The damper 41 includes a tubular shell, which has a closed bottom, and a rubber elastic portion, which is arranged in the shell. The damper 41 is entirely cylindrical and includes a center axis C that extends in the vertical direction. As shown in FIG. 3, the first support member 35 is welded and fixed to a portion of a circumferential surface of the damper 41 and located leftward from the center axis C. The two second support members 36 are welded and fixed to portions of the circumferential surface of the damper 41 located rightward from the center axis C. That is, the damper 41 is held by the first support member 35 and the second support members 36 from two opposite sides in the vehicle widthwise direction. Further, the lower end of the damper 41 is spaced apart from the upper surface of the front cross member 13. In this state, the damper 41 is supported by the first support member 35 and the second support members 36.

As shown in FIG. 4, the mount member 40 includes a bracket 42 fixed to an upper end of the damper 41. The bracket 42 includes a bottom wall 43 having the form of a rectangular plate extending in the front-to-rear direction. A bolt hole H3 extends through the bottom wall 43 in a front portion of the bottom wall 43. The bolt hole H3 lies along the center axis C of the damper 41 in the bottom wall 43. A bolt is inserted through the bolt hole H3 to fix the bottom wall 43 (bracket 42) to the upper end of the damper 41.

A plate-like rear wall 44 extends upward from a rear edge of the bottom wall 43. The dimension of the rear wall 44 in the widthwise direction decreases toward the upper side. The rear wall 44 includes a plurality of bolt holes H4 extending through the rear wall 44. The bolt holes H4 are arranged at an upper end and a central portion of the rear wall 44. Bolts (not shown) are inserted through the bolt holes H4 to fix the rear wall 44 (bracket 42) to the internal combustion engine E.

Two plate-like side walls 45 extend upward from two side edges of the bottom wall 43. A rear edge of each side wall 45 extends to the rear wall 44. The dimension of each side wall 45 in the front-to-rear direction decreases toward the upper side. That is, a front edge of each side wall 45 is inclined upward toward the rear. A front wall 46 that connects the left and right side walls 45 extends from the front edge of each side wall 45. An upper part and a lower part of the front wall 46 are cut out in an arcuate manner so that the bolt holes H4 of the rear wall 44 are exposed in a front view.

As shown in FIG. 3, extension walls 50 extend downward from the two side edges of the bottom wall 43. Each extension wall 50 has the form of a flat rectangular plate. Each extension wall 50 includes a lower end 50*a* located downward from the upper end of the damper 41. Distance X1 from the lower ends 50*a* of the extension walls 50 to the upper end of the damper 41 is greater than distance X2 from the upper surface of the front cross member 13 to the lower end of the damper 41.

As shown in FIG. 2, a front portion of each extension wall 50 is partially located beside the damper 41 and overlapped with the damper 41 in a side view. Each extension wall 50 includes a front end 50*b* located frontward from the center axis C of the damper 41. The front end 50*b* of each extension wall 50 is located at substantially the same position as the front end of the damper 41. The bracket 42 and the extension walls 50 are formed integrally with each other. The bracket 42 and the extension walls 50 are integrated when manufactured through, for example, casting.

The operation of the above power unit mount structure will now be described.

Figure 5:
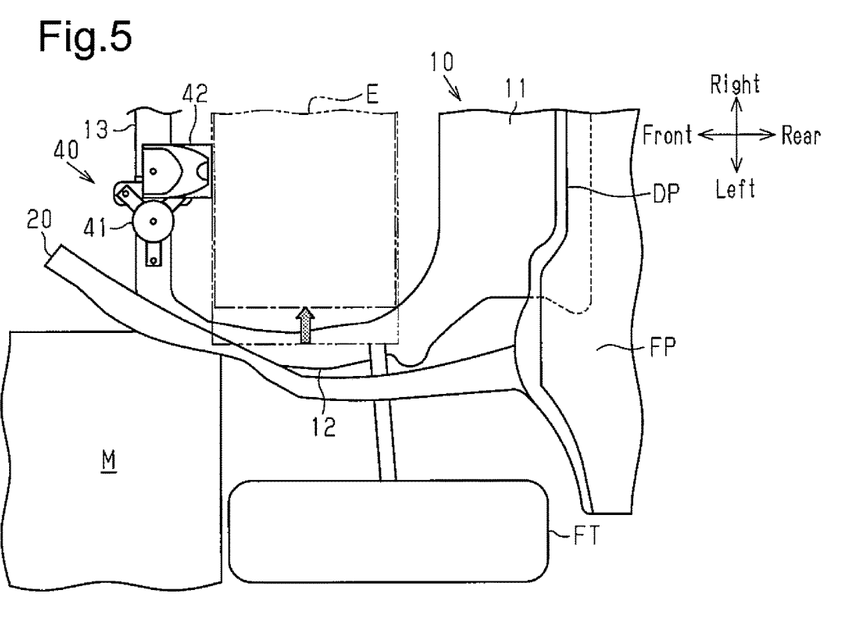
FIG. 5 is a diagram illustrating a comparative example of the transmission of load when a small overlap crash occurs in which extension walls do not extend downward from a bracket.

FIG. 5 shows a small overlap crash (small offset crash) in which the overlapping amount of the vehicle and a colliding object M in the vehicle widthwise direction is small. As shown in FIG. 5, when the colliding object M strikes the left side of the vehicle, the left front side member 20 is deformed inward (rightward). This may abut the left front side member 20 against the internal combustion engine E. In such a case, as shown by the arrow in FIG. 5, the internal combustion engine E will act to move rightward. This applies a large load to a portion (bolt) where the damper 41 and the bracket 42 are fixed to each other. An excessively large load on the fixed portion of the damper 41 and the bracket 42 will break the bolt and separate the damper 41 from the bracket 42. If such a situation were to occur in a structure in which the extension walls 50 do not extend downward from the bracket 42, the bracket 42 would be moved rightward together with the internal combustion engine E as shown in FIG. 5 when the internal combustion engine E moves rightward. Thus, the force that acts to move the internal combustion engine E rightward would not be transmitted by the bracket 42 to the damper 41 and the front cross member 13.

Figure 6:
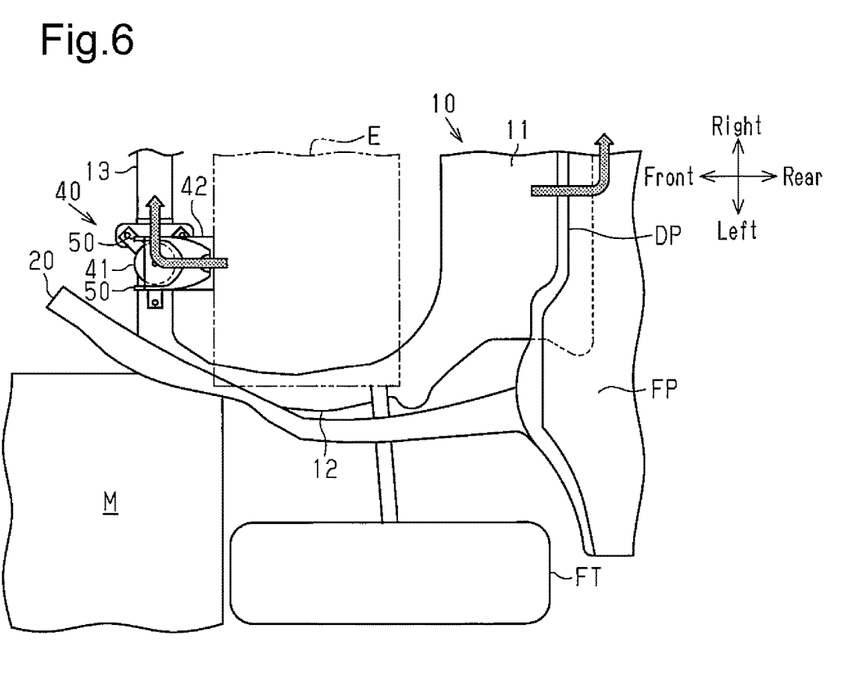
FIG. 6 is a diagram illustrating the transmission of load when a small overlap crash occurs.

In this regard, in the above embodiment, the two extension walls 50 extend downward from the bracket 42 of the mount member 40. One of the two extension walls 50 is located at the left side of the damper 41 and overlapped with the damper 41 in a side view. Thus, even if the damper 41 is separated from the bracket 42 as described above, when the internal combustion engine E acts to move rightward, the extension wall 50 will abut against the circumferential surface of the damper 41. As shown by the arrow in FIG. 6, this will transmit the force that acts to move the internal combustion engine E in the vehicle widthwise direction to the damper 41 and the front cross member 13. Further, the rear cross member 11 is fixed to the floor panel FP. Thus, as shown by the arrow in FIG. 6, the force that acts to move the suspension member 10 rightward will move the entire vehicle including the floor panel FP rightward. This efficiently transmits the load produced by the small overlap crash as load in the vehicle widthwise direction to the vehicle frame structure.

The damper 41 is entirely tubular. Thus, depending on the position where the extension wall 50 abuts against the circumferential surface of the damper 41, the force that acts to move the internal combustion engine E in the vehicle widthwise direction may not be efficiently transmitted to the damper 41. More specifically, for example, when the extension wall 50 abuts against a portion located rearward from the center axis C in the left side of the circumferential surface of the damper 41, force acts on the damper 41 diagonally toward the front right side even though the extension wall 50 abuts against the circumferential surface of the damper 41 from the left side.

In the above embodiment, the front ends 50*b* of the extension walls 50 are located frontward from the center axis C of the damper 41. Thus, the extension walls 50 abut against the outermost part of the circumferential surface of the damper 41. This ensures that force directed in the vehicle widthwise direction acts on the damper 41 when the extension walls 50 abut against the circumferential surface of the damper 41 in the vehicle widthwise direction. Thus, the force that acts to move the internal combustion engine E in the vehicle widthwise direction is transmitted further efficiently, as force in the vehicle widthwise direction, to the suspension member 10 and the floor panel FP.

In addition, the front end 50*b* of each extension wall 50 is located at substantially the same position as the front end of the damper 41. This ensures that the extension walls 50 abut against the circumferential surface of the damper 41 even if a small offset crash deforms the front cross member 13 of the suspension member 10 and slightly changes the positional relationship of the damper 41 and the extension walls 50.

When a small overlap crash such as that described above occurs, a large load is applied to portions where the damper 41 is fixed to the first support member 35 and the second support members 36 that support the damper 41. An excessively large load on the fixed portions may separate the damper 41 from the first support member 35 and the second support members 36 and cause the lower end surface of the damper 41 to abut against the upper surface of the front cross member 13.

In the above embodiment, distance X1 from the lower ends 50*a* of the extension walls 50 to the upper end of the damper 41 is greater than distance X2 from the upper surface of the front cross member 13 to the lower end of the damper 41. Thus, even if the damper 41 falls onto the front cross member 13, the lower ends 50*a* of the extension walls 50 will still be located downward from the upper end of the damper 41. Accordingly, even if the damper 41 falls onto the front cross member 13, lower portions of the extension walls 50 will abut against the circumferential surface of an upper portion of the damper 41. This will transmit the load produced by the small overlap crash to the front cross member 13 through the damper 41.

Further, the damper 41 is supported by the first support member 35 and the second support members 36 from the two opposite sides in the vehicle widthwise direction. Thus, even if the damper 41 falls onto the front cross member 13, the first support member 35 and the second support members 36 hold the damper 41 in place for a certain extent. In particular, the damper 41 is supported by the single first support member 35 and the two second support members 36 at three locations in the circumferential direction of the damper 41. Thus, even if the damper 41 falls onto the front cross member 13, movement of the damper 41 in the front-to-rear direction is restricted so that the damper 41 does not fall off from the front cross member 13.

Extension walls 50 that are separate from the bracket 42 may be welded or bolted and fixed to the bracket 42. In this case, when the extension walls 50 abut against the damper 41, load would be applied to the portions where the bracket 42 is fixed to the extension walls 50. When the fixed portions break and separate the extension walls 50 from the bracket 42, the force that acts to move the internal combustion engine E in the vehicle widthwise direction cannot be transmitted to the suspension member 10 through the extension walls 50.

In the above embodiment, the bracket 42 and the extension walls 50 are formed integrally through casting. Thus, there is no portion where the bracket 42 is bolted or welded and fixed to the extension walls 50. Since breakage does not occur at portions fixing the extension walls 50 and the bracket 42, the extension walls 50 do not separate from the bracket 42. Further, the integration of the bracket 42 and the extension walls 50 simplifies the coupling of components without increasing the number of components.

It should be apparent to those skilled in the art that the present disclosure may be embodied in many other specific forms without departing from the spirit or scope of the present disclosure. Particularly, it should be understood that the present disclosure may be embodied in the following forms.

The shapes of the suspension member 10 and the front side members 20 may be changed in accordance with the type of a vehicle to which the technique related to the above embodiment is applied.

Instead of the internal combustion engine E, the power unit may be any power unit, for example, a travel motor, a unit that integrates a travel motor and an internal combustion engine, and the like as long as the power unit generates power for the vehicle.

In the above embodiment, the mount member 40 is located leftward from the middle of the vehicle in the widthwise direction on the front cross member 13 of the suspension member 10. Instead, the mount member 40 may be located at the middle of the vehicle in the widthwise direction or located rightward from the middle. In addition, a plurality of mount members 40 may be arranged on the front cross member 13.

Instead of or in addition to the mount member 40 fixed to the front cross member 13 of the suspension member 10, the technique related to the extension walls 50 may be applied to a mount member fixed to each side rail 12 of the suspension member 10 or a mount member fixed to the rear cross member 11.

As long as the extension walls 50 at least partially overlap the damper 41 in a side view, the shapes and dimensions of the extension walls 50 may be changed. For example, the front ends 50b of the extension walls 50 may be located rearward from the center axis C of the damper 41. Further, distance X1 from the lower ends 50a of the extension walls 50 to the upper end of the damper 41 may be less than distance X2 from the upper surface of the front cross member 13 to the lower end of the damper 41.

Each extension wall 50 has the form of a flat rectangular plate. Instead, for example, the extension wall 50 may have the form of a plate curved in conformance with the circumferential surface of the damper 41. In this case, when the extension wall 50 abuts against the damper 41, the damper 41 is fitted into the extension wall 50. This restricts displacement of the damper 41 relative to the extension wall 50 in the front-to-rear direction of the vehicle even after the extension wall 50 abuts against the damper 41.

Further, for example, the bracket 42 may include a tubular extension wall downwardly extending from the bottom wall 43. In this case, the inner diameter of the tubular extension wall may be larger than the outer diameter of the damper 41 so that the upper portion of the damper 41 is arranged at the inner side of the extension wall. This also overlaps the extension wall with the damper 41 in a side view.

The extension walls 50 do not have to be formed integrally with the bracket 42. For example, extension walls 50 that are separate from the bracket 42 may be bolted or welded and fixed to the bracket 42. In this case, a certain degree of strength is required to fix the extension walls 50 and the bracket 42 so that the extension walls 50 do not separate from the bracket 42 even if the extension walls 50 abut against the damper 41 and break the fixed portions of the bracket 42. In some embodiments, the strength fixing the extension walls 50 and the bracket 42 be greater than the strength fixing the damper 41 and the bracket 42.

The extension wall 50 may be arranged only at one of the two opposite sides of the damper 41 in the vehicle widthwise direction. For example, if the extension wall 50 is arranged at the left side of the damper 41, force that acts to move the internal combustion engine E rightward will be transmitted to the suspension member 10 during the occurrence of a small offset crash that is shifted toward the left side in the vehicle widthwise.

Instead of having the form of a cylinder, the damper 41 may have the form of a polygonal post such as a tetragonal post. The damper 41 does not need to be post-shaped. As long as the damper 41 includes a rubber elastic portion and an upper end where the bracket 42 is fixed, the damper 41 may have any shape.

The lower end of the damper 41 may abut against the upper surface of the front cross member 13.

The shapes and numbers of the first support member 35 and the second support members 36 that support the damper 41 may be changed. For example, one support member may be arranged at one side of the damper 41 in the vehicle widthwise direction, and another support member may be arranged at the opposite side of the damper 41.

The first support member 35 and the second support members 36 may be omitted. In this case, the shell of the damper 41 may be directly bolted or welded and fixed to the suspension member 10 (front cross member 13).

The entire shape of the bracket 42 may be changed in accordance with the positional relationship of the damper 41 and the internal combustion engine E, the shape of the internal combustion engine E, and the like.

The present examples and embodiments are to be considered as illustrative and not restrictive, and the present disclosure is not to be limited to the details given herein, but may be modified within the scope and equivalence of the appended claims.

The invention claimed is:

1. A power unit mount structure applied to a vehicle, the power unit mount structure comprising:
   a mount member located between a suspension member and a power unit that is arranged upward from the suspension member and generates power for the vehicle; and
   support members located at two opposite sides of the damper in a vehicle widthwise direction, wherein
   the mount member includes
      a damper fixed to the suspension member, and
      a bracket fixed to a top end of the damper and coupling the damper to the power unit,
   an extension wall that extends downward from the bracket,
   the extension wall at least partially overlaps the damper in a side view, the support members support the damper in a state upwardly spaced apart from the suspension member, and a distance from a lower end of the extension wall to the top end of the damper is greater than a distance from an upper surface of the suspension member to a lower end of the damper.

2. The power unit mount structure according to claim 1, wherein the damper is cylindrical and includes a center axis that extends in a vertical direction, and a front end of the extension wall is located frontward from the center axis of the damper.

3. The power unit mount structure according to claim 1, wherein the bracket and the extension wall are formed integrally with each other.

4. A power unit mount structure applied to a vehicle, the power unit mount structure comprising:

a mount member located between a suspension member and a power unit that is arranged upward from the suspension member and generates power for the vehicle; and support members located at two opposite sides of the damper in a vehicle widthwise direction, wherein the mount member includes a generally cylindrical damper fixed to the suspension member, the damper includes a tubular shell having a closed bottom and an elastic portion provided within the tubular shell, and a bracket fixed to an upper end of the elastic portion of the damper and coupling the damper to the power unit, an extension wall that extends downward from the bracket, the extension wall at least partially overlaps the damper in a side view, the support members support the damper in a state upwardly spaced apart from the suspension member, and a distance from a lower end of the extension wall to an upper end of the damper is greater than a distance from an upper surface of the suspension member to a lower end of the damper.

5. The power unit mount structure according to claim 4, wherein the damper is entirely cylindrical and includes a center axis that extends in a vertical direction, and a front end of the extension wall is located frontward from the center axis of the damper.

6. The power unit mount structure according to claim 4, wherein the bracket and the extension wall are formed integrally with each other.

7. A power unit mount structure applied to a vehicle, the power unit mount structure comprising:

a mount member located between a suspension member and a power unit that is arranged upward from the suspension member and generates power for the vehicle; and support members located at two opposite sides of the damper in a vehicle widthwise direction, wherein the mount member includes a damper fixed to the suspension member, a bracket that includes a bottom wall, a rear wall that extends upwardly from the bottom wall, and an extension wall that extends downwardly from the bottom wall, the bottom wall is fixed to an upper end of the damper, the rear wall coupling the damper to the power unit, and the extension wall at least partially overlaps the damper in a side view, the support members support the damper in a state upwardly spaced apart from the suspension member, and a distance from a lower end of the extension wall to an upper end of the damper is greater than a distance from an upper surface of the suspension member to a lower end of the damper.

8. The power unit mount structure according to claim 7, wherein the damper is cylindrical and includes a center axis that extends in a vertical direction, and a front end of the extension wall is located frontward from the center axis of the damper.

9. The power unit mount structure according to claim 7, wherein the bracket and the extension wall are formed integrally with each other.

10. A power unit mount structure applied to a vehicle, the power unit mount structure comprising:

a mount member located between a suspension member and a power unit that is arranged upward from the suspension member and generates power for the vehicle, wherein the mount member includes a damper fixed to the suspension member, and a bracket fixed to a top end of the damper and coupling the damper to the power unit, two extension walls that extend downward from the bracket, and one of the two extension walls at least partially overlaps with the damper in a side view from one side in a vehicle widthwise direction and the other of the two extension walls at least partially overlaps with the damper in a side view from the other side in the vehicle widthwise direction.

11. The power unit mount structure according to claim 10, wherein the damper is cylindrical and includes a center axis that extends in a vertical direction, and a front end of at least one of the two extension walls is located frontward from the center axis of the damper.

12. The power unit mount structure according to claim 10, wherein the bracket and the two extension walls are formed integrally with each other.

13. A power unit mount structure applied to a vehicle, the power unit mount structure comprising a mount member located between a suspension member and a power unit that is arranged upward from the suspension member and generates power for the vehicle, wherein the mount member includes a generally cylindrical damper fixed to the suspension member, the damper includes a tubular shell having a closed bottom and an elastic portion provided within the tubular shell and a bracket fixed to an upper end of the elastic portion of the damper and coupling the damper to the power unit, two extension walls that extend downward from the bracket, and one of the two extension walls at least partially overlaps with the damper in a side view from one side in a vehicle widthwise direction and the other of the two extension walls at least partially overlaps with the damper in a side view from the other side in the vehicle widthwise direction.

14. The power unit mount structure according to claim 13, wherein
the damper is entirely cylindrical and includes a center axis that extends in a vertical direction, and
a front end of at least one of the two extensions wall is located frontward from the center axis of the damper.

15. The power unit mount structure according to claim 13, wherein the bracket and the two extension walls are formed integrally with each other.

16. A power unit mount structure applied to a vehicle, the power unit mount structure comprising
a mount member located between a suspension member and a power unit that is arranged upward from the suspension member and generates power for the vehicle, wherein
the mount member includes
a damper fixed to the suspension member, and
a bracket that includes a bottom wall, a rear wall that extends upwardly from the bottom wall, and two extension walls that extend downwardly from the bottom wall, the bottom wall is fixed to an upper end of the damper, the rear wall coupling the damper to the power unit, and one of the two extension walls at least partially overlaps with the damper in a side view from one side in a vehicle widthwise direction and the other of the two extension walls at least partially overlaps with the damper in a side view from the other side in the vehicle widthwise direction.

17. The power unit mount structure according to claim 16, wherein
the damper is cylindrical and includes a center axis that extends in a vertical direction, and
a front end of at least one the two extension walls is located frontward from the center axis of the damper.

18. The power unit mount structure according to claim 16, wherein the bracket and the two extension walls are formed integrally with each other.

* * * * *